United States Patent
Wang et al.

(10) Patent No.: US 9,857,646 B2
(45) Date of Patent: Jan. 2, 2018

(54) LIQUID CRYSTAL DISPLAY DEVICE AND DISPLAY PANEL

(71) Applicant: Shenzhen China Star Optoelectronics Technology Co., Ltd., Shenzhen, Guangdong (CN)

(72) Inventors: Cong Wang, Guangdong (CN); Peng Du, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 0 days.

(21) Appl. No.: 14/893,489

(22) PCT Filed: Sep. 29, 2015

(86) PCT No.: PCT/CN2015/091045
§ 371 (c)(1),
(2) Date: Nov. 23, 2015

(87) PCT Pub. No.: WO2017/045228
PCT Pub. Date: Mar. 23, 2017

(65) Prior Publication Data
US 2017/0075158 A1    Mar. 16, 2017

(30) Foreign Application Priority Data
Sep. 14, 2015  (CN) .......................... 2015 1 0583091

(51) Int. Cl.
*G02F 1/1345*  (2006.01)

(52) U.S. Cl.
CPC ................. *G02F 1/13452* (2013.01)

(58) Field of Classification Search
CPC ........... G02F 1/13452; G02F 1/136286; G02F 1/1368
See application file for complete search history.

(56) References Cited

U.S. PATENT DOCUMENTS

| 6,683,669 | B1 | 1/2004 | Fujikawa | |
|---|---|---|---|---|
| 2004/0051836 | A1* | 3/2004 | Jung | G02F 1/1345 349/149 |
| 2008/0129944 | A1 | 6/2008 | Park | |
| 2011/0122052 | A1 | 5/2011 | Chen | |

(Continued)

FOREIGN PATENT DOCUMENTS

| CN | 1763948 A | 4/2006 |
|---|---|---|
| CN | 1811540 A | 8/2006 |

(Continued)

*Primary Examiner* — Nathanael R Briggs
(74) *Attorney, Agent, or Firm* — Andrew C. Cheng

(57) ABSTRACT

The invention discloses a liquid crystal display device and its display panel. The display panel includes: a display region; a fan-out region, which is connected to at least one side of the display region; the fan-out region includes at least one group of fan-out wires, each group of the fan-out wires includes a plurality of wires, the wires include a first layer of metal wires and a second layer of metal wires that are disposed alternately, a part of the first layer of metal wires and the second layer of metal wires that are adjacent is overlapped. By the method above, the invention can reduce RC delay between the wires of each group of fan-out wires and improve display quality.

12 Claims, 3 Drawing Sheets

(56) References Cited

U.S. PATENT DOCUMENTS

2011/0279418 A1 11/2011 Han
2013/0044044 A1 2/2013 Ha

FOREIGN PATENT DOCUMENTS

| CN | 102799005 A | 11/2011 |
|----|-------------|---------|
| JP | 10-339880 A | 12/1998 |
| KR | 20080022360 A | 3/2008 |

\* cited by examiner

LIQUID CRYSTAL DISPLAY DEVICE AND DISPLAY PANEL

BACKGROUND

1. Technical Field

The invention relates to the field of liquid crystal display technology, and more particularly to a liquid crystal display device and a display panel.

2. Description of the Related Art

In design of a display panel, impedances of marginal regions and a central region of a group of fan-out regions have much difference.

The difference of impedances of the fan-out regions contributes to a result that color cast during mixture or hot pixels caused by difference of the central part and two sides of a display panel, which due to RC delay of data lines or scan lines of the display panel is not synchronous.

SUMMARY

Exemplary embodiments of the invention provide a liquid crystal display device and a display panel, which can decrease RC delay among wires of each group of fan-out wires and improve display quality.

The invention provides a display panel, including:
a display region;
a fan-out region, which is connected to at least one side of the display region;
the fan-out region including at least one group of fan-out wires, each group of the fan-out wires including a plurality of wires, the wires including a first layer of metal wires and a second layer of metal wires that are disposed alternately, a part of the first layer of metal wires and the second layer of metal wires that are adjacent overlapped;
the wires including N wires, a part of a first wire and a second wire of the N wires overlapped, a width of overlap of the first wire and the second wire satisfying:

$$a_1 = p_1 - s$$

where $p_1$ is a distance between peaks of the two adjacent wires; s is a minimum distance between wires on the same layer;
odd wires of the N wires being the first layer of metal wires, even wires of the N wires being the second layer of metal wires;
the first wire and a N wire of the N wires being virtual wires.

A part of the second wire and a third wire of the N wires is overlapped, a width of overlap of the second wire and the third wire satisfies:

$$a_2 = \frac{\left[h + (p_2 - p_1)\tan\theta - \frac{p_2 - p_1}{\cos\theta}\right](p_1 - s)h}{\left[h - (p_2 - p_1)\tan\theta + \frac{p_2 - p_1}{\cos\theta}\right]^2}$$

where $p_2$ is a distance between bottoms of the two adjacent wires; h is a height of the fan-out region; $\theta$ is an angle of the fan-out region with oblique lines.

Apart of the n wire and a n+1 wire of the N wires is overlapped, a width of overlap of the n wire and the n+1 wire satisfies:

$$a_n = \frac{(a_{n-1} + p_1)L_{n-1}(a_{n-2}L_{n-2} + a_{n-1}L_{n-1}) - (a_{n-2} + p_1)a_{n-1}L_nL_{n-1}}{(a_{n-2} + p_1)L_n^2}$$

where n is an integer that is larger than 2; the $L_n$ satisfies:

$$L_n = h - (n-1)(p_2 - p_1)\tan\theta + (n-1)\frac{p_2 - p_1}{\cos\theta}.$$

The invention also provides a display panel, including:
a display region;
a fan-out region, which is connected to at least one side of the display region;
the fan-out region including at least one group of fan-out wires, each group of the fan-out wires including a plurality of wires, the wires including a first layer of metal wires and a second layer of metal wires that are disposed alternately, a part of the first layer of metal wires and the second layer of metal wires that are adjacent overlapped.

The wires include N wires, a part of a first wire and a second wire of the N wires is overlapped, a width of overlap of the first wire and the second wire satisfies:

$$a_1 = p_1 - s$$

where $p_1$ is a distance between peaks of the two adjacent wires; s is a minimum distance between wires on the same layer.

A part of the second wire and a third wire of the N wires is overlapped, a width of overlap of the second wire and the third wire satisfies:

$$a_2 = \frac{\left[h + (p_2 - p_1)\tan\theta - \frac{p_2 - p_1}{\cos\theta}\right](p_1 - s)h}{\left[h - (p_2 - p_1)\tan\theta + \frac{p_2 - p_1}{\cos\theta}\right]^2}$$

where $p_2$ is a distance between bottoms of the two adjacent wires; h is a height of the fan-out region; $\theta$ is an angle of the fan-out region with oblique lines.

Apart of the n wire and a n+1 wire of the N wires is overlapped, a width of overlap of the n wire and the n+1 wire satisfies:

$$a_n = \frac{(a_{n-1} + p_1)L_{n-1}(a_{n-2}L_{n-2} + a_{n-1}L_{n-1}) - (a_{n-2} + p_1)a_{n-1}L_nL_{n-1}}{(a_{n-2} + p_1)L_n^2}$$

where n is an integer that is larger than 2; the $L_n$ satisfies:

$$L_n = h - (n-1)(p_2 - p_1)\tan\theta + (n-1)\frac{p_2 - p_1}{\cos\theta}.$$

The peaks of the N wires and a drive circuit of the display panel are connected, the bottoms of the N wires and the display region are connected.

Odd wires of the N wires are the first layer of metal wires, even wires of the N wires are the second layer of metal wires.

The first wire and a N wire of the N wires are virtual wires.

Impedance factors of the N wires are the same.

The invention also provides a liquid crystal display device, including a display panel, the display panel includes:
a display region;
a fan-out region, which is connected to at least one side of the display region;
the fan-out region including at least one group of fan-out wires, each group of the fan-out wires including a plurality of wires, the wires including a first layer of metal wires and a second layer of metal wires that are disposed alternately, a part of the first layer of metal wires and the second layer of metal wires that are adjacent overlapped.

The wires include N wires, a part of a first wire and a second wire of the N wires is overlapped, a width of overlap of the first wire and the second wire satisfies:

$$a_1 = p_1 - s$$

where $p_1$ is a distance between peaks of the two adjacent wires; s is a minimum distance between wires on the same layer.

A part of the second wire and a third wire of the N wires is overlapped, a width of overlap of the second wire and the third wire satisfies:

$$a_2 = \frac{\left[h + (p_2 - p_1)\tan\theta - \frac{p_2 - p_1}{\cos\theta}\right](p_1 - s)h}{\left[h - (p_2 - p_1)\tan\theta + \frac{p_2 - p_1}{\cos\theta}\right]^2}$$

where $p_2$ is a distance between bottoms of the two adjacent wires; h is a height of the fan-out region; $\theta$ is an angle of the fan-out region with oblique lines.

A part of the n wire and a n+1 wire of the N wires is overlapped, a width of overlap of the n wire and the n+1 wire satisfies:

$$a_n = \frac{(a_{n-1} + p_1)L_{n-1}(a_{n-2}L_{n-2} + a_{n-1}L_{n-1}) - (a_{n-2} + p_1)a_{n-1}L_nL_{n-1}}{(a_{n-2} + p_1)L_n^2}$$

where n is an integer that is larger than 2; the $L_n$ satisfies:

$$L_n = h - (n-1)(p_2 - p_1)\tan\theta + (n-1)\frac{p_2 - p_1}{\cos\theta}.$$

The peaks of the N wires and a drive circuit of the display panel are connected, the bottoms of the N wires and the display region are connected.

Odd wires of the N wires are the first layer of metal wires, even wires of the N wires are the second layer of metal wires.

The first wire and a N wire of the N wires are virtual wires.

Impedance factors of the N wires are the same.

Benefits of the invention according to the proposal above are: the fan-out region of the invention including at least one group of fan-out wires, each group of the fan-out wires including a plurality of wires, the wires including a first layer of metal wires and a second layer of metal wires that are disposed alternately, a part of the first layer of metal wires and the second layer of metal wires that are adjacent overlapped, which can decrease RC delay among wires of each group of fan-out wires and improve display quality.

BRIEF DESCRIPTION OF THE DRAWINGS

For further description of the proposal of the invention, figures of exemplary embodiments are referred to illustrate, obviously, the following figures are merely detailed description of the preferred embodiments, for those skilled persons in the art, various modifications and variations can be made according to the figures of the invention.

DETAILED DESCRIPTION

In the following detailed description of the preferred embodiments, reference is made to the accompanying drawings which form a part hereof, and in which is shown by way of illustration specific embodiments in which the invention may be practiced. For those skilled persons in the art, various modifications and variations can be made according to the invention, therefore, the invention needs not be limited to the disclosed embodiments.

Figure 1:
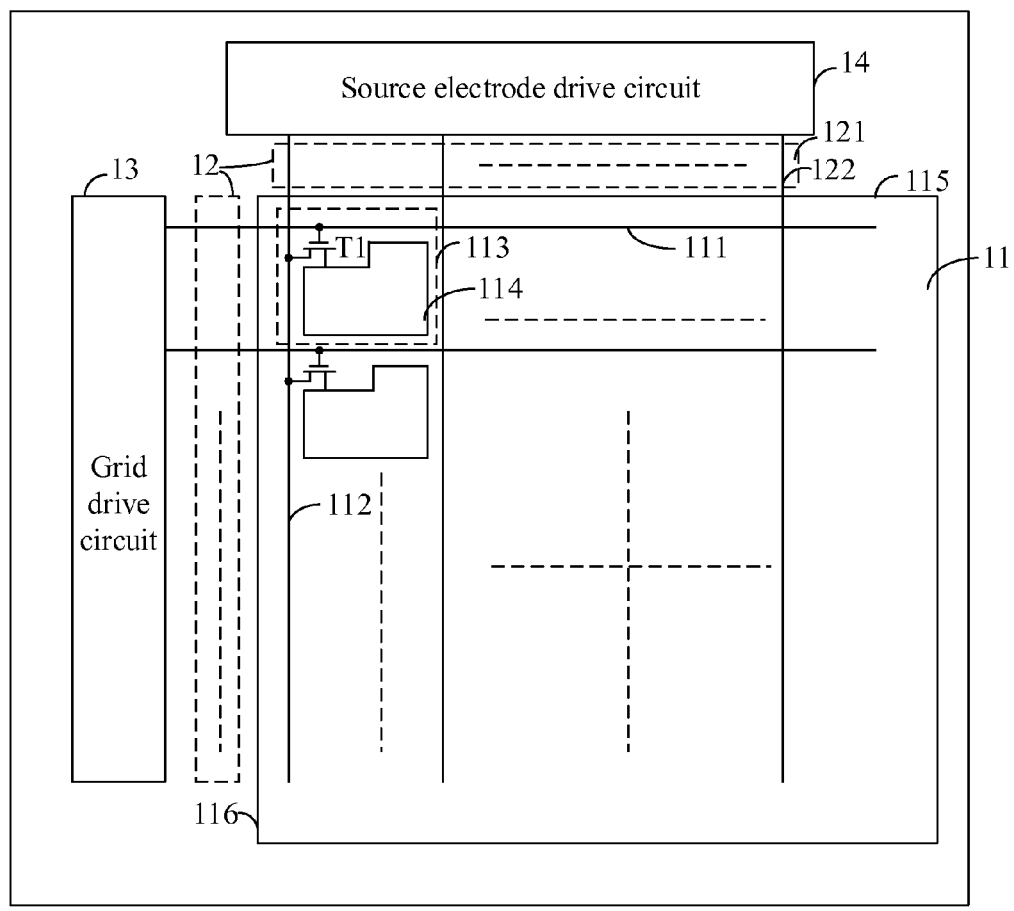
FIG. 1 is a schematic structural of a display panel according to a first exemplary embodiment of the invention.

Referring to FIG. 1, FIG. 1 is a schematic structural of a display panel according to a first exemplary embodiment of the invention. As shown in FIG. 1, the display panel disclosed by the exemplary embodiment includes a display region 11 and a fan-out region 12, the fan-out region 12 is connected to at least one side of the display region.

A grid drive circuit 13 and a source electrode drive circuit 14 are disposed on the display panel, the grid drive circuit 13 and the source electrode drive circuit 14 are disposed on the display panel by a chip on film (COF).

The display region 11 is applied to display images, which includes a plurality of scan lines 111 and a plurality of data lines 112, the scan lines 111 and data lines 112 are disposed alternately on the display region 11 to form numerous pixels 113. Each of the pixels 113 includes at least one pixel electrode 114 and at least one thin film transistor T1, a grid of the thin film transistor T1 and the corresponding scan lines 111 are connected, a source electrode of the thin film transistor T1 and the corresponding data lines 112 are connected, a drain electrode of the thin film transistor T1 and the pixel electrode 114 are connected. When grid drive signals received by the grid of the thin film transistor T1 are high levels, the thin film transistor T1 is turned on, the pixel electrode 114 is charged by the data lines 112.

The grid drive circuit 13 first outputs scanning signals to the scan lines 111 by the fan-out region 12 to turn on the thin film transistor T1 of a first line of the pixels 113, the source electrode drive circuit 14 outputs signals to the data lines 112 by the fan-out region 12 simultaneously to charge the pixel electrode 114 of the first line of the pixels 113 according to digital signals as required to display various grey scales; then the grid drive circuit 13 outputs scanning signals to turn on the thin film transistor T1 of a second line of the pixels 113. The source drive circuit 14 charges the second line of the pixel electrode 114 by a second line of the thin film transistor T1; following the sequence until the whole pixel electrode 114 of the display region 11 is charged, the first line of the pixels 113 is rescanned.

Preferably, the fan-out region 12 is connected to two sides 115 and 116 of the display region 11. The fan-out region includes at least one group of fan-out wires 121, each of the fan-out wires 121 includes a plurality of wires 122.

Figure 2:
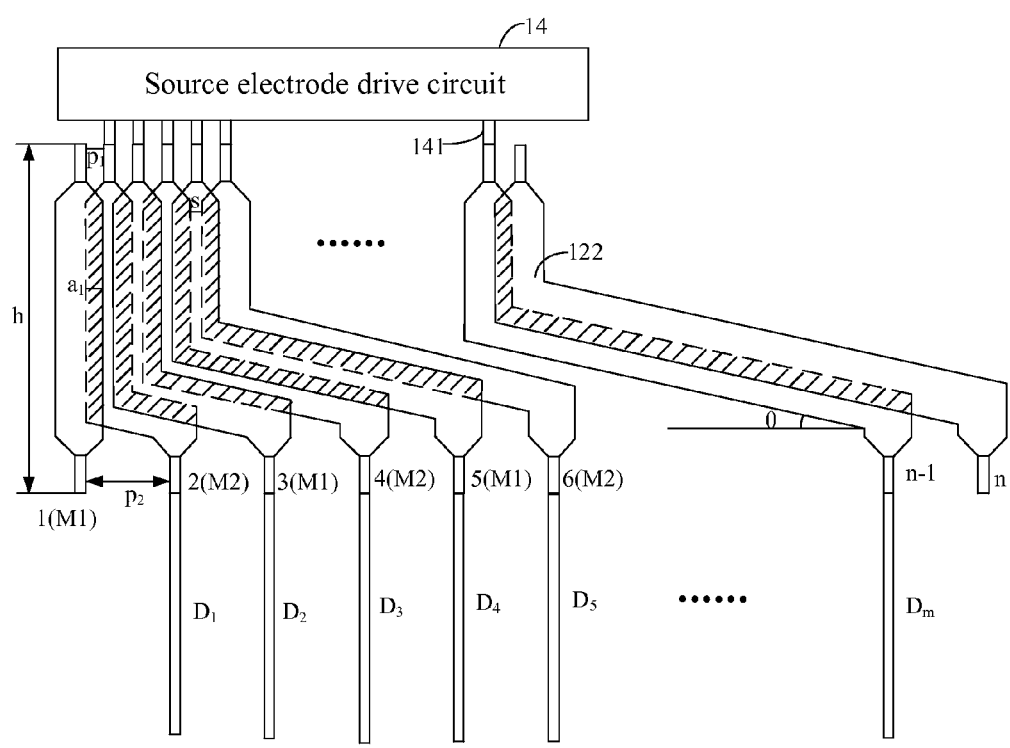
FIG. 2 is a schematic structural of a fan-out wire in FIG. 1.

Referring to FIG. 2, FIG. 2 is a schematic structural of a fan-out wire in FIG. 1. The source drive circuit 14 is taken as an example in the exemplary embodiment, in practice, other chips with a plurality of leads disposed on the display panel, such as the grid drive circuit 13, can also be applied on the designed structure according to the invention.

The wires 122 include a first metal wire M1 and a second metal wire M2 disposed alternately, such as the first metal wire M1 is manufactured by GE process, the second metal wire M2 is manufactured by SE process. The first metal wire M1 and the second metal wire M2 are insulated from each other, and a part of the first metal wire M1 and the second metal wire M2 that are adjacent is overlapped.

As shown in FIG. 2, a group of fan-out wires 121 include N wires 122, where N is an integer that is larger than or equal to 1. Preferably, odd wires of the N wires are the first layer of metal wires M1, even wires of the N wires 122 are the second layer of metal wires M2; in other words, odd wires like a first wire 122, a third wire 122, a fifth wire 122 of the N wires are the first layer of metal wires M1; even wires like a second wire 122, a fourth wire 122, a sixth wire are the second layer of metal wires M2. In other exemplary embodiments, odd wires of the N wires can be set to be the second layer of metal wires M2, even wires of the N wires 122 can be set to be the first layer of metal wires M1 by the trained people in the art.

In the exemplary embodiment, a part of the adjacent two wires 122 is overlapped. A part of the first wire 122 and the second wire 122 of the N wires 122 is overlapped, a width of overlap of the first wire and the second wire is $a_1$; a part of the second wire 122 and the third wire 122 of the N wires 122 is overlapped, a width of overlap of the second wire and the third wire is $a_2$; according to the same rule, a part of a n−1 wire 122 and a n wire 122 of the N wires 122 is overlapped, a width of overlap of the n−1 wire and the n wire is $a_{n-1}$. n is smaller than or equal to N.

The peaks of the N wires 122 and a drive circuit of the display panel are connected, the bottoms of the N wires 122 and the display region 11 are connected, which means the peaks of the N wires 122 and a lead 141 of the source electrode drive circuit 14 are connected, the bottoms of the N wires 122 and data lines $D_1, D_2, \ldots, D_m$ of the display region 11 are connected, as a distance among the lead 141 of the source electrode drive circuit 14 and a distance among the data lines $D_1, D_2, \ldots, D_m$ are both fixed, a distance $p_1$ between peaks of the two adjacent wires 122 and a distance $p_2$ between bottoms of the two adjacent wires 122 are constant, which means a distance between the peak of the n−1 wire 122 and the bottom of the n wire 122 is $p_1$, a distance between the bottom of the n−1 wire 122 and the peak of the n wire 122 is $p_2$. Preferably, the distance among the lead 141 of the source electrode drive circuit 14 is $p_1$; the distance among the data lines $D_1, D_2, \ldots, D_m$ is $p_2$. m=N−2.

In the exemplary embodiment, impedance factors τ of the N wires 122 are the same to reduce RC delay of adjacent two wires 122. The impedance factor τ is a product of a resistance times capacitance of wires, which is:

$$\tau = RC \tag{1}$$

A width of the n wire 122 is supposed to be $w_n$, where n is an integer that is larger than 2. A minimum distance between metal wires on the same layer is s, which means a minimum distance between the first layer of metal wire M1 (the first wire 122) and the first layer of metal wire M1 (the third wire 122) is s, or a minimum distance between the second layer of metal wire M2 (the second wire 122) and the second layer of metal wire M2 (the fourth wire 122) is s, sheet resistance of the N wires is Rs, a height of the N wires 122 is h.

A width of the first wire 122 is:

$$w_1 = 2p_1 - s \tag{2}$$

A width of overlap of the first wire 122 and the second wire 122 is:

$$a_1 = \frac{w_1 - s}{2} = p_1 - s \tag{3}$$

Resistance of the first wire 122 is:

$$R_1 = R_s \frac{L_1}{w_1} = R_s \frac{h}{w_1} \tag{4}$$

Capacitance of the first wire 122 is:

$$C_1 = 2\frac{\varepsilon_0 \varepsilon_r a_1 L_1}{d} \tag{5}$$

$$A = \frac{\varepsilon_0 \varepsilon_r}{d} \tag{6}$$

Substitute the formula (6) for the formula (5), what can be achieved is:

$$C_1 = 2A(p_1 - s)h \tag{7}$$

According to formulas (1), (4) and (7):

$$\tau_1 = R_1 C_1 = 2AR_s \frac{L_1}{w_1} a_1 L_1 \tag{8}$$

A RC influence factor of the second wire 122 is:

$$L_2 = h - (p_2 - p_1)\tan\theta + \frac{(p_2 - p_1)}{\cos\theta} \tag{9}$$

θ is an angle of the fan-out region with oblique lines 123 in the fan-out region 12, that is an angle of the region with oblique lines of the N wires 122.

A width of the second wire 122 is:

$$w_2 = a_1 + p_1 \tag{10}$$

Capacitance of the second wire 122 is:

$$C_2 = \frac{\varepsilon_r \varepsilon_0 a_1 L_1}{d} + \frac{\varepsilon_r \varepsilon_0 a_2 L_2}{d} = A(a_1 L_1 + a_2 L_2) \tag{12}$$

A impedance factor $\tau_2$ of the second wire 122 is:

$$\tau_2 = R_2 C_2 = AR_s \frac{L_2}{a_1 + p_1}(a_1 L_1 + a_2 L_2) \tag{13}$$

The impedance factors τ of N wires 122 are the same, that is:

$$\tau_1 = \tau_2 \tag{14}$$

Substitute the formulas (8) and (14) for the formula (5), the overlap width of the second wire 122 and the third wire 122 achieved is:

$$a_2 = \frac{\left[h + (p_2 - p_1)\tan\theta - \frac{p_2 - p_1}{\cos\theta}\right](p_1 - s)h}{\left[h - (p_2 - p_1)\tan\theta + \frac{p_2 - p_1}{\cos\theta}\right]^2} \tag{15}$$

Similarly, a RC influence factor of the n wire 122 is:

$$L_n = h - (n-1)(p_2 - p_1)\tan\theta + (n-1)\frac{(p_2 - p_1)}{\cos\theta} \tag{16}$$

A width of the n wire 122 is:

$$w_n = a_{n-1} + p_1 \tag{17}$$

Capacitance of the n wire 122 is:

$$C_n = A(a_{n-1}L_{n-1} + a_n L_n) \quad (18)$$

A impedance factor $\tau_n$ of the n wire 122 is:

$$\tau_n = AR_s \frac{L_n}{w_n}(a_{n-1}L_{n-1} + a_n L_n) \quad (19)$$

An overlap width of the n wire 122 and the n+1 wire 122 is:

$$a_n = \frac{(a_{n-1} + p_1)L_{n-1}(a_{n-2}L_{n-2} + a_{n-1}L_{n-1}) - (a_{n-2} + p_1)a_{n-1}L_n L_{n-1}}{(a_{n-2} + p_1)L_n^2} \quad (20)$$

In the N wires 122, the first wire 122 and the N wire 122 are virtual wires to overlap m wires 122 applied to transmit signals and two adjacent wires 122. The impedance factors $\tau$ of N wires 122 are set to be the same by defining width of overlap part of the adjacent two wires 122 according to the formulas (3), (15) and (20), which can reduce RC delay between the first metal wire and the second metal wire and improve display quality of a display panel.

Figure 3:
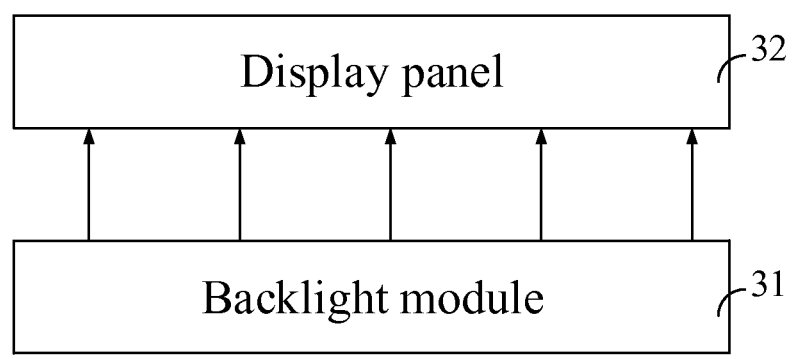
FIG. 3 is a schematic structural of a liquid crystal display device according to a first exemplary embodiment of the invention.

The invention also provides a liquid crystal display, as shown in FIG. 3, the liquid crystal display according to the invention includes a backlight module 31 and a display panel 32 disposed on bright side of the backlight module 31, the display panel 32 is the display panel disclosed in the exemplary embodiments above that can be referred.

In summary, the fan-out region in the invention includes at least a group of fan-out wires, each group of fan-out wires includes a plurality of wires, the wires include the first layer of metal wires and the second layer of metal wires that are disposed alternately, a part of the first layer of metal wires and the second layer of metal wires that are adjacent is overlapped to equal the impedance factors of the wires, which can reduce RC delay between the first metal wire and the second metal wire and improve display quality of a display panel.

The embodiments are preferred chosen and described in order to best explain the present invention. It is not intended to be exhaustive or to limit the invention to the precise form or to exemplary embodiments disclosed. It is intended that the scope of the invention is defined by the claims appended hereto and their equivalents in which all terms are meant in their broadest reasonable sense.

What is claimed is:

1. A display panel, wherein the display panel comprises:
a display region;
a fan-out region, which is connected to at least one side of the display region;
wherein the fan-out region comprises at least one group of fan-out wires, each group of the fan-out wires comprises a plurality of wires, the wires comprise a first layer of metal wires and a second layer of metal wires that are disposed alternately, a part of the first layer of metal wires and the second layer of metal wires that are adjacent is overlapped;
wherein the wires comprise N wires, a part of a first wire and a second wire of the N wires is overlapped, a width of overlap of the first wire and the second wire satisfies:

$$a_1 = p_1 - s$$

where $p_1$ is a distance between peaks of the two adjacent wires; s is a minimum distance between wires on the same layer.

2. The display panel according to claim 1, wherein a part of the second wire and a third wire of the N wires is overlapped, a width of overlap of the second wire and the third wire satisfies:

$$a_2 = \frac{\left[h + (p_2 - p_1)\tan\theta - \frac{p_2 - p_1}{\cos\theta}\right](p_1 - s)h}{\left[h - (p_2 - p_1)\tan\theta + \frac{p_2 - p_1}{\cos\theta}\right]^2}$$

where $p_2$ is a distance between bottoms of the two adjacent wires; h is a height of the fan-out region; $\theta$ is an angle of the fan-out region with oblique lines.

3. The display panel according to claim 2, wherein apart of the n wire and a n+1 wire of the N wires is overlapped, a width of overlap of the n wire and the n+1 wire satisfies:

$$a_n = \frac{(a_{n-1} + p_1)L_{n-1}(a_{n-2}L_{n-2} + a_{n-1}L_{n-1}) - (a_{n-2} + p_1)a_{n-1}L_n L_{n-1}}{(a_{n-2} + p_1)L_n^2}$$

where n is an integer that is larger than 2; the $L_n$ satisfies:

$$L_n = h - (n-1)(p_2 - p_1)\tan\theta + (n-1)\frac{p_2 - p_1}{\cos\theta}.$$

4. The display panel according to claim 3, wherein the peaks of the N wires and a drive circuit of the display panel are connected, the bottoms of the N wires and the display region are connected.

5. The display panel according to claim 1, wherein odd wires of the N wires are the first layer of metal wires, even wires of the N wires are the second layer of metal wires.

6. The display panel according to claim 1, wherein impedance factors of the N wires are the same.

7. A liquid crystal display device, wherein the liquid crystal display device comprises a display panel, the display panel comprises:
a display region;
a fan-out region, which is connected to at least one side of the display region;
wherein the fan-out region comprises at least one group of fan-out wires, each group of the fan-out wires comprises a plurality of wires, the wires comprise a first layer of metal wires and a second layer of metal wires that are disposed alternately, a part of the first layer of metal wires and the second layer of metal wires that are adjacent is overlapped;
wherein the wires comprise N wires, a part of a first wire and a second wire of the N wires is overlapped, a width of overlap of the first wire and the second wire satisfies:

$$a_1 = p_1 - s$$

where $p_1$ is a distance between peaks of the two adjacent wires; s is a minimum distance between wires on the same layer.

8. The liquid crystal display device according to claim 7, wherein a part of the second wire and a third wire of the N wires is overlapped, a width of overlap of the second wire and the third wire satisfies:

$$a_2 = \frac{\left[h + (p_2 - p_1)\tan\theta - \frac{p_2 - p_1}{\cos\theta}\right](p_1 - s)h}{\left[h - (p_2 - p_1)\tan\theta + \frac{p_2 - p_1}{\cos\theta}\right]^2}$$

where $p_2$ is a distance between bottoms of the two adjacent wires; h is a height of the fan-out region; θ is an angle of the fan-out region with oblique lines.

9. The liquid crystal display device according to claim 8, wherein apart of the n wire and a n+1 wire of the N wires is overlapped, a width of overlap of then wire and the n+1 wire satisfies:

$$a_n = \frac{(a_{n-1} + p_1)L_{n-1}(a_{n-2}L_{n-2} + a_{n-1}L_{n-1}) - (a_{n-2} + p_1)a_{n-1}L_n L_{n-1}}{(a_{n-2} + p_1)L_n^2}$$

where n is an integer that is larger than 2; the $L_n$ satisfies:

$$L_n = h - (n-1)(p_2 - p_1)\tan\theta + (n-1)\frac{p_2 - p_1}{\cos\theta}.$$

10. The liquid crystal display device according to claim 9, wherein the peaks of the N wires and a drive circuit of the display panel are connected, the bottoms of the N wires and the display region are connected.

11. The liquid crystal display device according to claim 7, wherein odd wires of the N wires are the first layer of metal wires, even wires of the N wires are the second layer of metal wires.

12. The liquid crystal display device according to claim 7, wherein impedance factors of the N wires are the same.

* * * * *